(12) United States Patent
Tundal et al.

(10) Patent No.: US 10,882,101 B2
(45) Date of Patent: Jan. 5, 2021

(54) APPARATUS AND METHOD FOR THE REMOVAL OF UNWANTED INCLUSIONS FROM METAL MELTS

(71) Applicant: NORSK HYDRO ASA, Oslo (NO)

(72) Inventors: Ulf Tundal, Sunndalsøra (NO); Idar Kjetil Steen, Sunndalsøra (NO); John Olav Fagerlie, Sunndalsøra (NO); Terje Haugen, Surnadal (NO)

(73) Assignee: NORSK HYDRO ASA, Oslo (NO)

( * ) Notice: Subject to any disclaimer, the term of this patent is extended or adjusted under 35 U.S.C. 154(b) by 565 days.

(21) Appl. No.: 15/548,200

(22) PCT Filed: Jan. 28, 2016

(86) PCT No.: PCT/NO2016/000004
§ 371 (c)(1),
(2) Date: Aug. 2, 2017

(87) PCT Pub. No.: WO2016/126165
PCT Pub. Date: Aug. 11, 2016

(65) Prior Publication Data
US 2018/0264545 A1   Sep. 20, 2018

(30) Foreign Application Priority Data

Feb. 6, 2015  (NO) .................................... 20150180
Feb. 25, 2015  (NO) .................................... 20150265

(51) Int. Cl.
*B22D 11/119*  (2006.01)
*C22B 9/02*  (2006.01)
*C22B 21/06*  (2006.01)

(52) U.S. Cl.
CPC ............ *B22D 11/119* (2013.01); *C22B 9/023* (2013.01); *C22B 21/066* (2013.01); *C22B 21/068* (2013.01); *Y02P 10/20* (2015.11)

(58) Field of Classification Search
CPC ..... B22D 11/119; C22B 9/023; C22B 21/066; C22B 21/068
See application file for complete search history.

(56) References Cited

U.S. PATENT DOCUMENTS

| 4,277,280 | A | 7/1981 | Montgrain | |
| 6,488,743 | B1 * | 12/2002 | Venås | C22B 9/05 |
| | | | | 95/246 |

(Continued)

FOREIGN PATENT DOCUMENTS

| CN | 203728904 | 7/2014 |
| GB | 701273 | 12/1953 |

(Continued)

OTHER PUBLICATIONS

NO 318003 B machine translation (Year: 2005).*
International Search Report dated Apr. 20, 2016 in International Application No. PCT/NO2016/000004.

*Primary Examiner* — Tima M. McGuthry-Banks
(74) *Attorney, Agent, or Firm* — Wenderoth, Lind & Ponack, L.L.P.

(57) ABSTRACT

Apparatus and method for filtering molten metal, in particular aluminium, including a container (1) with an outer shell or casing of metal and an inner thermally insulated interior cladding or wall construction made of heat resistant insulation and refractory material. A removable lid (2) provided on top of the container to keep the container sealed (air tight) during operation, the container (1) being provided with an inlet chamber (3) having an inlet opening (4) receiving metal from a metal supply launder (10) and an outlet chamber (5) with an outlet opening (6) in which a ceramic or refractory filter (7) is mounted.

14 Claims, 6 Drawing Sheets

(56) References Cited

U.S. PATENT DOCUMENTS 7,379,663 B2 * 5/2008 Vincent ................ B22D 11/117
                                                                                                        392/465
2002/0185790 A1 12/2002 Klingensmith et al.
2008/0053275 A1 3/2008 Belley et al.

FOREIGN PATENT DOCUMENTS

| | | |
|---|---|---|
| JP | 60-5829 | 1/1985 |
| NO | 318003 | 1/2005 |
| WO | 2005/080028 | 9/2005 |

* cited by examiner

APPARATUS AND METHOD FOR THE REMOVAL OF UNWANTED INCLUSIONS FROM METAL MELTS

BACKGROUND OF THE INVENTION

1. Technical Field

The present invention concerns an apparatus and method for the removal of unwanted inclusions from metal melts by filtration.

2. Description of the Related Art

It is generally known to remove small inclusions from molten metal such as molten aluminium by filtration. A typical material used for such filters is porous ceramic or refractory material, commonly referred to as CFF (Ceramic Foam Filters). These CF filters are not easily wetted by the molten metal and since such materials have relatively fine pores, considerable difficulties are encountered in initiating the flow of metal through the filter (priming the filter). It is therefore generally known to use deep filter boxes to generate sufficient metal head by gravitation to force the metal through the filter.

Japanese patent application, JP 60-5829 relates to a filtering method which proposes the use of a vacuum to prime a CF filter and where the filter is provided in the bottom of an evacuation vessel in vacuum tank. The vacuum tank is set under vacuum by a vacuum pump and metal is thereby forced to flow from the vessel through the filter and into the vacuum tank and further through an outlet to a casting site. Once the flow is initiated the vacuum pump is halted and the metal flows by itself based on a metal head (gravity).

EP 1 735 120 describes a method and apparatus for the initiation of flow of metal through a filter in an in-line molten metal filtration unit having a porous ceramic or refractory filter mounted horizontally in a filter box. The filter box is provided with an inlet and outlet for the molten metal. When operating the apparatus, metal is supplied through the inlet to fully cover the filter and the outlet is closed whereby the box set under vacuum such the metal is forced downstream through the filter. Then as soon as the metal flow is initiated, the vacuum is taken off and the outlet is opened such that the metal may flow through the filter on the basis of gravity. Thus, the vacuum is just used to initiate the metal flow through the filter.

The use of a CF filter involves extra costs. These costs are partly linked to the filter itself that must be replaced, normally after each casting operation. There is also some cost related to heating the CF filter and the filter box. In addition, the filter boxes according to the prior art as referred to above have a reservoir of metal below the filter which must be drained after each casting cycle. For a large single filter box, the amount of drained metal may amount to 5-600 kg per cast. The cost associated with remelting of metal is typically 1000 NOK/ton, which gives 10-15 NOK per ton finished goods (depending on charge size).

For a filter with small pore sizes (>~50 PPI (pores per inch)) it may also be problematic getting the entire filter activated (primed) during startup and thus enable it to function optimally. Priming of the entire filter is often linked to correct preheating, but can also be linked to obtaining high enough pressure on the initial metal that goes through the filter. Possible solutions suggested are overpressure in front of the filter or under-pressure behind the filter as is referred to in the prior art solutions mentioned in the above cited JP and EP references. Another known solution is a CF apparatus with a filter solution using an electromagnetic field that "pushes" the metal through the filter. This solution is quite expensive and is also encumbered with poor metal draining.

SUMMARY OF THE INVENTION

With the present invention is provided a CF filter apparatus that reduces operational cost since it is self-draining and needs no metal removal after each casting operation. Further, the new CF filter concept provides very good priming of the filter.

BRIEF DESCRIPTION OF THE DRAWINGS

The invention will be further described in the following by way of examples and with reference to the drawings where.

DETAILED DESCRIPTION OF THE INVENTION

Figure 1:
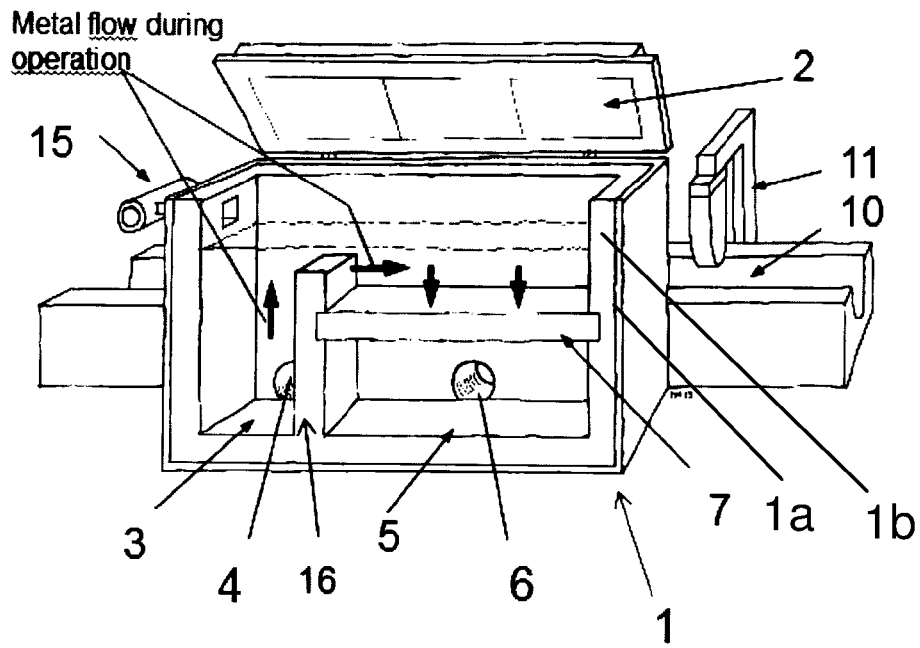
FIG. 1 shows in perspective view a cross section of a CF filter device or apparatus according to the invention.
Figure 2:
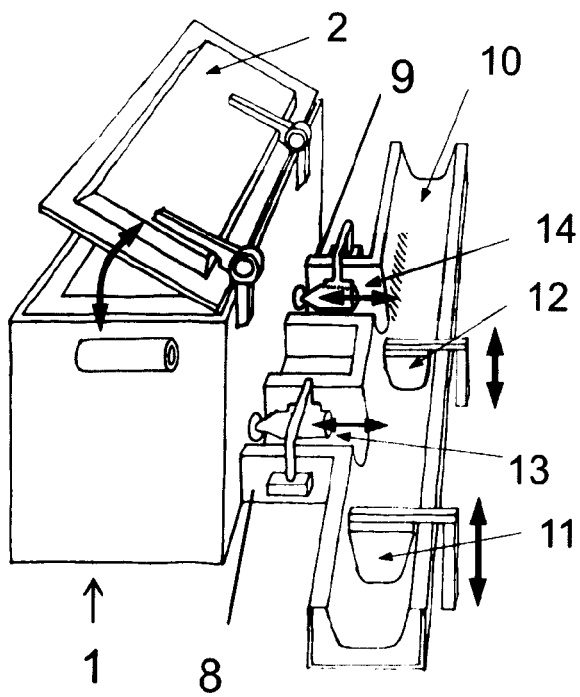
FIG. 2 shows a partly longitudinal view of the CF filter apparatus as shown in FIG. 1, but with the inlet and outlet connected to a parallel provided launder for the supply of metal to and from the filter apparatus.

Referring to FIGS. 1 and 2, the CF filter apparatus according to the present invention includes a container or box construction 1 with an outer shell or casing of metal 1*a* and an inner thermally insulated interior cladding or wall construction 1*b* made of heat resistant insulation and refractory material. A removable lid 2 is provided (preferably hinged to the container) on top of the container to keep the container sealed off (air tight) during operation of the CF filter 7. The container 1 has an inlet chamber 3 with an inlet opening 4 (the inlet chamber should be as small as possible), and an outlet chamber 5 with an outlet opening 6 where the CF filter 7 is mounted.

The inlet chamber 3 and outlet chamber 5 are provided side by side within the container 1, being split by a partition wall 16 extending from the bottom of the container and upwardly, to a preset height (approximately ⅔) of the container height.

Referring to FIG. 2, the container is connected in parallel with a metal supply launder 10 via transversal metal launder stubs 8, 9 respectively provided between the inlet 4 and outlet 6 openings and the metal supply launder 10. To control the metal flow in the metal supply launder, two dams or valve discs (butterfly type valves) are provided in the launder 10, one dam 11 by the outlet of the container 1 and the other dam 12 in the launder 10 between the two launder stubs 8 and 9.

The inlet and outlet openings of the container are further provided with closures or stoppers 13, 14 respectively (not further described).

Preferably a programmable logic control (PLC) is provided to control the operation of the filter apparatus according to the invention. This PLC unit will not be further described and is not shown in the figures since it is regarded as forming part of the general knowledge base for the skilled person within this field.

Figure 3:
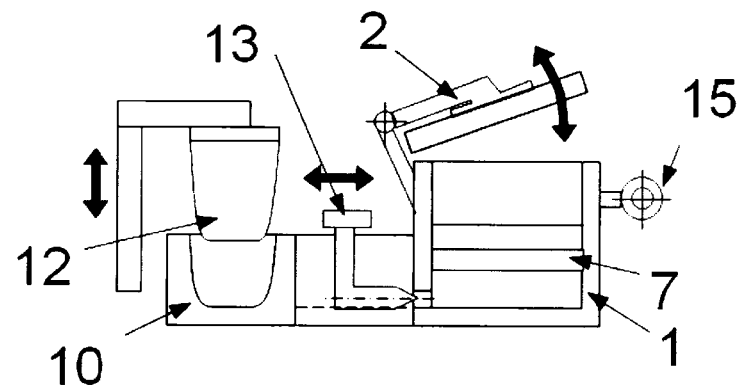
FIG. 3 shows in smaller scale a schematic cross section of the filter apparatus and launder as shown in the previous figures.

FIG. 3 shows as stated above in smaller scale a schematic cross section of the filter apparatus and launder as shown in the previous FIGS. 1 and 2. As can be seen, the container 1 at its upper part is connected to an ejector device or other air evacuating means 15 to enable evacuation of air from the container. Thus, by closing the lid 2 it is possible to set the container under vacuum and thereby draw liquid metal from the launder and into the container and further raise the metal level in the container as will be explained below.

Figure 4:
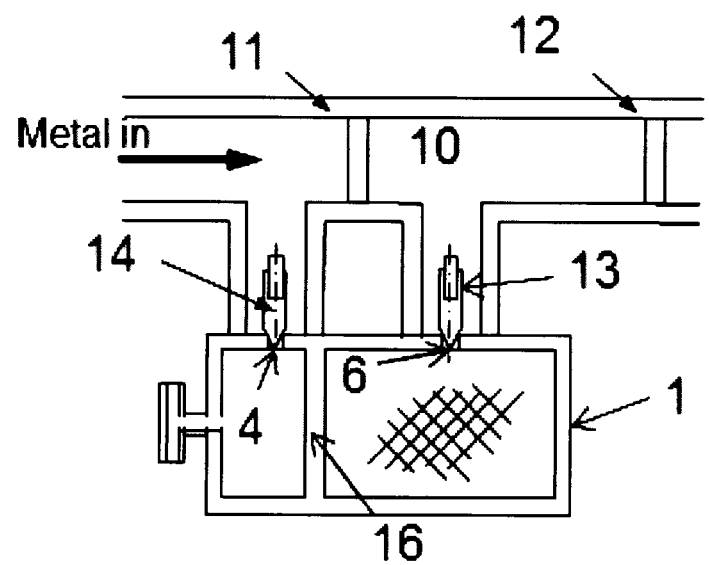
FIGS. 4-8 show schematically and also in smaller scale top cross sections of sequences of operational steps of the apparatus according to the invention.

The working principle of the filter apparatus according to the invention is, with reference to FIGS. 4-8, as follows:

When using the filter apparatus in connection with a metal casting operation, metal is supplied from a metal reservoir such as a molten metal holding furnace by the launder 10 to the filter container 1. Referring to FIG. 4, both the inlet 4 and the outlet 6 openings are closed by means of the stoppers 13, 14 respectively during filling of the launder. The ejector is then started and air is thereby evacuated form the container as soon as the metal level is above the openings.

Figure 5:
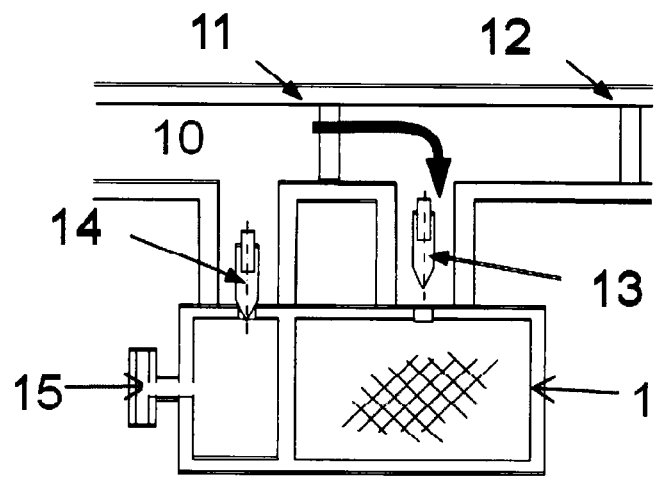

Further referring to FIG. 5, the priming operation is now performed by opening the stoppers 14 at the inlet 4 and 13 at the outlet 6 of the filter container, and the under-pressure (vacuum) created by the ejector lifts the metal until it meets the underside of the filter 7 in the outlet chamber and to a position slightly above the top of the filter in the inlet chamber. Then the inlet is closed with the stopper 14 and the underpressure is further increased until the metal is forced backwards up through the filter.

By evacuating the filter container before opening the outlet, the priming operation can be controlled by adjusting the outlet opening 6 with the stopper 13. In this way the priming operation can be performed faster and be better controlled.

The under-pressure above the filter determines the force applied to the metal. The under-pressure can then be adjusted to give good priming also for CF filters with high PPI values.

Figure 6:
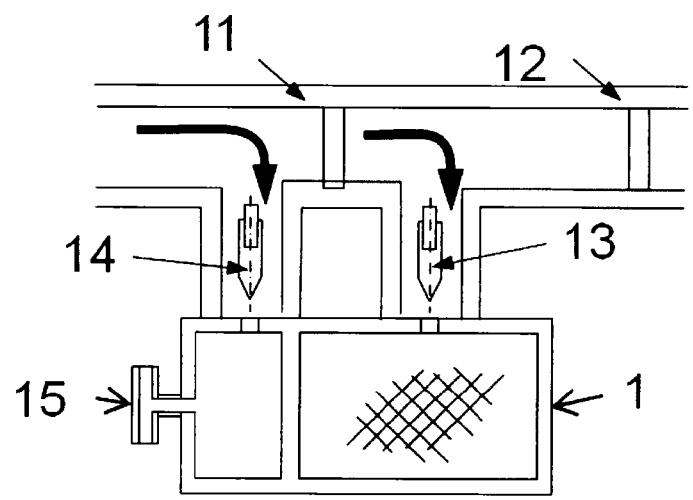
Figure 7:
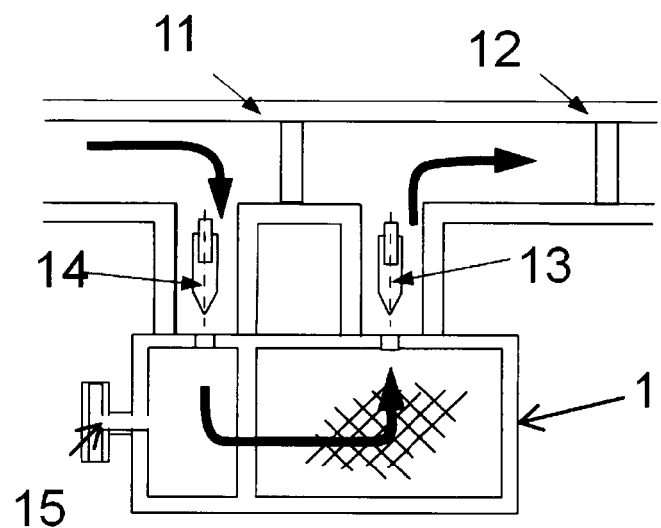
Figure 8:
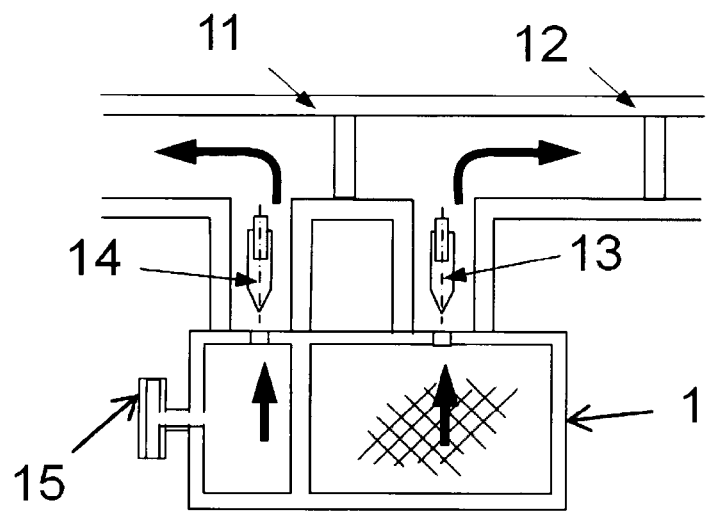

After the filter has been primed, the inlet 4 is opened by withdrawal of the stopper 14 as is shown in FIG. 6. Then, referring to FIG. 7, when the metal level inside the filter container has reached a preset level above the partition wall 16, the dam 12 (see in addition FIG. 2) between the inlet and outlet openings is closed whereas the dam 11 close to the filter container is opened. The metal is now forced to go through the CF filter and the metal level is held at its pre-set position by the vacuum caused by the ejector or vacuum source 15. The height difference (metal head) between the metal outside the inlet opening and the metal outside the outlet opening is the driving force to get the metal through the CF filter.

At the end of the casting operation the metal level inside the container 1 is gradually lowered by reducing the under-pressure. When the metal has reached a certain level, the dam 11 between the inlet 4 and the outlet 6 is opened, and all the metal in the box is released to the casting pit (not shown).

The metal in the inlet chamber 3 (which preferably should be as small as possible) will either go backwards or towards the casting pit, however it will not enter the part of product that goes to the customer.

The stopper 13 at the outlet opening 6 is mainly there to avoid oxides and other inclusions at the top of the melt to enter the filter container and cause problems in the priming operation.

As previously mentioned, it could be an advantage to evacuate the filter container prior to opening the stopper 13 at the outlet 6. The priming can then be performed faster and with more under-pressure (vacuum) as the metal enters the filter openings.

One option which may ease the priming operation would be to flush the filter box with argon gas prior to the evacuation process. This may reduce the oxidizing of the metal that enters the filter box, which probably is beneficial in the priming operation. As the priming is done in the reverse direction it is important that the CF filter is properly fastened to the interior of the container (not further shown).

A simpler embodiment of the filter box can be obtained without the stoppers 13 and 14. In that case it could be beneficial to have dams (not shown) at the start of the transversal metal launder stubs 8 and 9 to release metal to the filter box only from the bottom of the launder by gradually rising the dams. This will prevent oxides and other non-metallic particles at the top of the melt to enter the filter box. As soon as the metal level is above the inlet and the outlet openings 4, 6, the ejector 15 starts to evacuate the air inside the box 1 drawing the metal upwards in the inlet and outlet chambers 3, 5. The metal will stop against the bottom of the filter 7 in the outlet chamber because there is a resistance for the metal to enter into a filter with small pores. In the inlet chamber the metal will continue to rise as the under-pressure increases. When the height difference between the bottom of the filter 7 and the metal inside the inlet chamber 3 has reached a certain level, the pressure on the bottom of the filter will be high enough to prime the filter. The maximum pressure for priming that can be obtained with this solution will be the height difference between the bottom of the filter 7 and the top of the partition wall 16. This difference will be limited by the operational difficulties in mounting and dismounting the CF filter 7 very far down in a deep outlet chamber. Thus, this solution may work well for relatively coarse filters where the necessary pressure to prime the filters are not too high.

As an alternative embodiment, there could also be an option to make the inlet chamber larger and the outlet chamber smaller mounting the CF filter just above the opening of the inlet chamber. In that case the direction of the flow of the metal will be the same in the priming phase as in the operational phase. The drawback is that there will be more metal released towards the casting pit at end of the end of each casting operation that has not gone through the CF filter.

Figure 10:
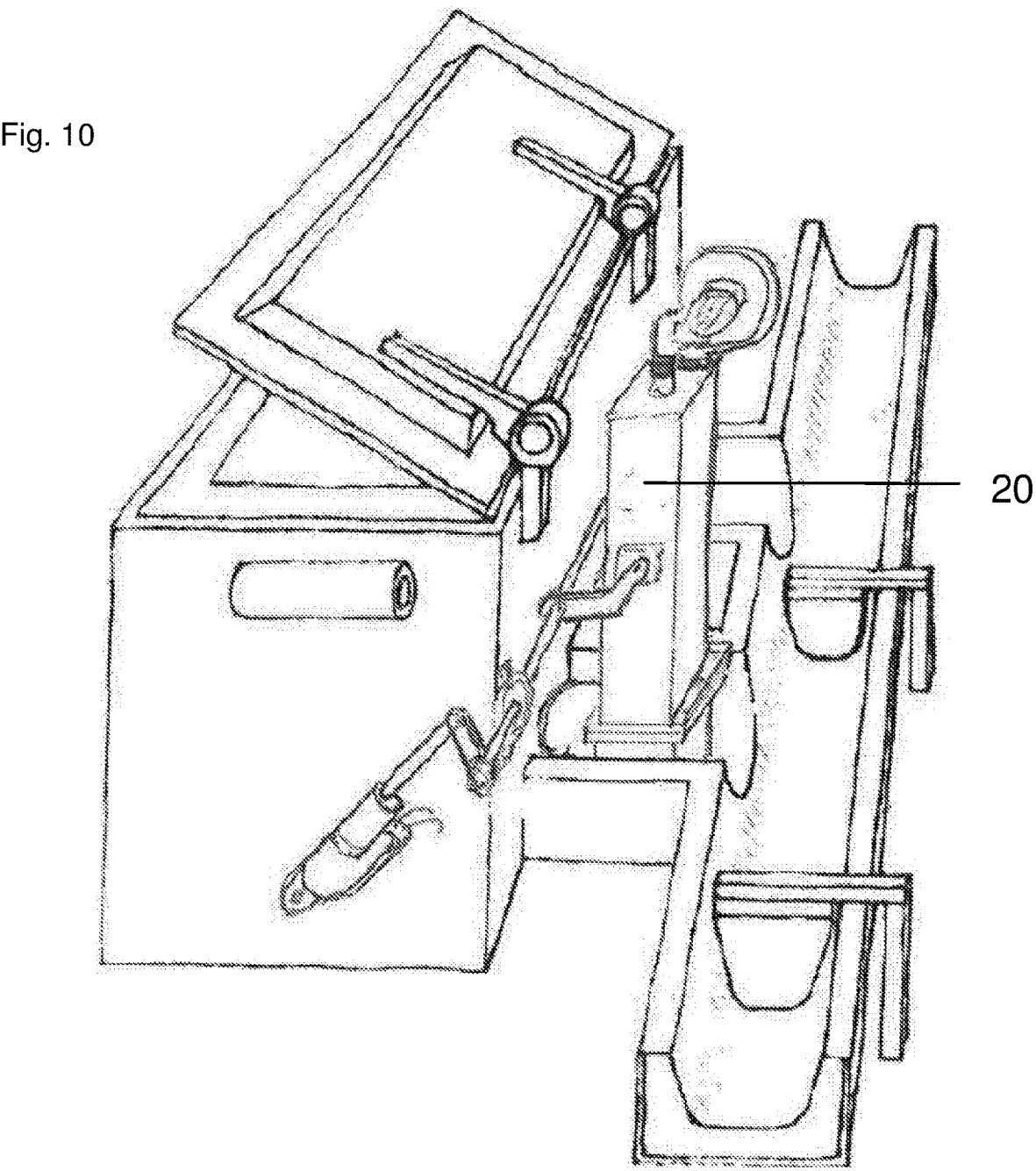
FIG. 10 shows a partly longitudinal view of the CF filter apparatus as shown in FIG. 1, but with a schematic representation of a pre-heating system.

Preheating of the CF filter and the filter container prior to the metal filtering operation is important. This can either be done with a pre-heating system 20 through the inlet or the outlet opening (see FIG. 10) or there could be some arrangement for preheating in the lid of the filter container (not shown).

As an alternative embodiment, a double filter box can be made by having one inlet chamber and two outlet chambers with separate filters. With two outlet openings and corresponding stoppers, the CF filters can be primed one by one. Without stoppers in front of the openings, the filters will be primed in a similar way as described for one outlet chamber.

In a further embodiment, there is also an option to not empty the filter container between each casting operation, but instead reuse the CF filter for several casting cycles. This can be done by closing both the inlet and the outlets and keeping the melt hot in between each casting operation. By keeping an under-pressure in the container it will be easier to avoid melt leakages in the inlet and outlet openings during the casting break.

The proposed way of priming according to the invention is very beneficial for dual filter options, one filter above the other, where it would be possible to have a coarse filter as an initial filtering step and a finer filter afterwards, and preferably with a gap in between. In a standard filter box there will very likely be air trapped in between the filters when the first metal goes through the upper filter and covers the lower filter. To avoid this, a tube may be provided in conjunction with the surface of the upper filter and up above the metal level to let the air in between the filters escape. When the priming of the lower filter is complete the tube can be removed.

With the current invention the lower filter with the smallest pores that is most difficult to prime will then be the first one to be primed. The whole priming operation with two filters will not require any manual handling as for the current filter box layout.

As to the application of two filters, it should be added that the invention is not restricted to the above described solution. Thus, it may be possible to provide the filters respectively in the inlet chamber 3 and outlet chamber 5. It may, within the scope of the invention, even be possible to use a combination of three or more filters if desired.

Figure 9:
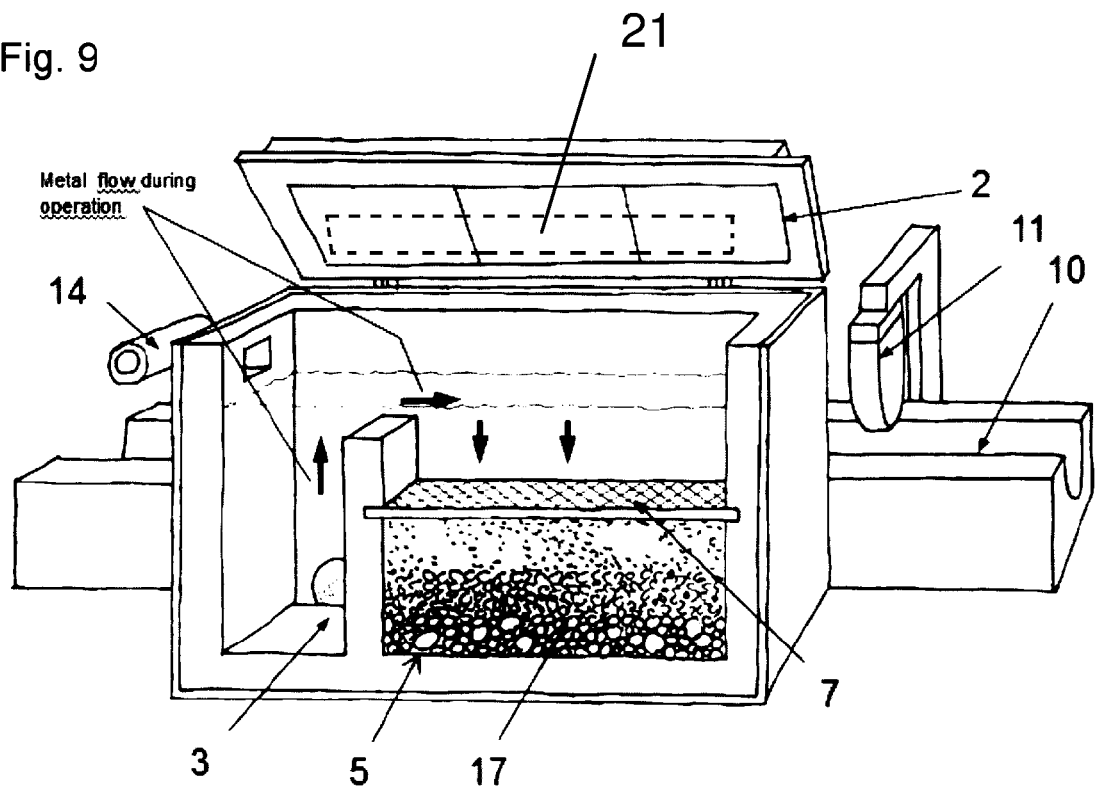
FIG. 9 shows in cross section and partly perspective view a further embodiment of a CF filter apparatus according to the invention as shown in FIGS. 1 and 2.

The principle of lifting the metal to avoid draining can also be utilized for Bonded Particle Filters (BPF) and Deep Bed Filters (DBF). This BPF filter medium is an aggregate of either SiC or $Al_2O_3$ granules, graded to a specific particle size distribution and then bonded together using a ceramic binder. In a further embodiment as shown in FIG. 9, the outlet chamber can be made much larger and deeper than what is indicated in the figures and be filled with $Al_2O_3$ balls 17 (or similar), as in a Deep Bed Filter (DBF). Normally, a DBF is not emptied between casts since it contains several tons of metal that has to be drained and scrapped. Also, after emptying a standard filter box there will be severe oxidation of the fractions of metal left inside because of the air that will be available. With the present invention the metal inside the outlet chamber can be slowly released by adding argon gas to reduce the under-pressure and the chamber almost emptied to the casting pit towards the end of the cast. With the inlet and outlet openings sealed with metal and the temperature inside the filter box maintained during the break between two casts, there will be almost no oxygen and therefore very little oxidation of aluminium inside the filter box during the break. When the next cast starts only a fraction of the previous alloy is left inside the filter box. Therefore a change in alloy, at least within the same alloy system, should normally not be a problem.

This way it could be possible to operate a DBF also for a casting line with more frequent alloy changes. For operational performance it would be preferable having one filtering apparatus in operation at each casting line while one is being rebuilt with new $Al_2O_3$ balls. The lid would only need to be opened when the $Al_2O_3$ balls have to be replaced, e.g. approximately every 5000 tons (manual opening).

The invention claimed is:

1. An apparatus for filtering molten metal including:
    a container having an outer shell or casing of metal and an inner thermally insulated interior cladding or wall construction made of heat resistant insulation and refractory material, the container having an inlet opening and an outlet opening;
    a lid removably provided on top of the container to keep the container sealed during operation;
    a metal supply launder connected to the container via transversal metal launder stubs, the container being provided with an inlet chamber communicating with the inlet opening for receiving metal from the metal supply launder and an outlet chamber communicating with the outlet opening; and
    a ceramic or refractory filter disposed in the inlet chamber and/or the outlet chamber of the container, wherein
    the inlet chamber and outlet chamber are provided side by side and are split by a partition wall extending from a bottom of the container and upwardly to a preset level of the container interior height,
    the container is connected in parallel with the metal supply launder via the transversal metal launder stubs respectively provided between the inlet and outlet openings and the metal supply launder,
    the launder being provided with a dam or valve device by the outlet of the container and another dam or valve device between the two launder stubs,
    the inlet opening of the container and the outlet opening of the container being provided with closures or stoppers enabling closing and opening of the inlet opening and the outlet opening of the container, respectively.

2. The apparatus in accordance with claim 1, wherein the ceramic or refractory filter is provided in the outlet chamber.

3. The apparatus in accordance with claim 1, wherein the ceramic filter is mounted in the inlet chamber just above the inlet opening and the outlet chamber is smaller than the inlet chamber.

4. The apparatus in accordance with claim 1, wherein the container is provided with a second outlet chamber provided with a separate filter and with a second outlet, wherein the second outlet is provided with a closure or stopper.

5. The apparatus in accordance with claim 1, wherein the container is provided with a second inlet chamber with a separate filter and with a second inlet opening, wherein the second inlet is provided with a closure or stopper.

6. The apparatus in accordance with claim 1, wherein outlet chamber is filled with $Al_2O_3$ balls or another media for a deep bed filter.

7. The apparatus in accordance with claim 1, wherein the filter is a bonded particle filter.

8. A method for filtering molten metal in accordance with the apparatus of claim 1, wherein priming and operation of the filter is accomplished by the following steps:
    supplying metal from a metal reservoir by the launder and the dam by the outlet opening being closed and the dam between the two launder stubs being open, until the supplied metal is at a level above the inlet and outlet openings;
    evacuating air from the container as soon as the metal level is above the inlet and outlet openings and thereby drawing the metal upwards in the inlet chamber and the outlet chamber such that the metal will stop against the bottom of the filter but will continue to rise in the inlet chamber as an under-pressure is increased,
    wherein a height difference between the partition wall and the bottom of the filter will provide a metal pressure on the filter and eventually prime the filter;
    adjusting the under-pressure until the metal reaches a pre-set level above the partition wall;

opening the dam by the outlet and simultaneously closing the dam between the two launder stubs and maintaining the under-pressure in the container at a pre-set level thereby causing the metal to flow through the container;

wherein, by the end of the casting operation, gradually lowering the metal level inside the container by reducing the under-pressure in the container; and opening the dam between the two launder stubs when the metal has reached a preset level and releasing all of the remaining metal in the container to a casting pit.

9. The method in accordance with claim 8, wherein the filter prior to each filtering operation is heated to a temperature close to or above an aluminum smelting temperature.

10. The method in accordance with claim 8, wherein the container is flushed with inert gas prior to the evacuating air from the container.

11. A method for filtering molten metal in accordance with the apparatus of claim 1, wherein priming and operation of the filter is accomplished by the following steps for a filter box with stoppers:

supplying metal from a metal reservoir by the launder with the inlet and outlet openings being closed with stoppers and the dam by the outlet opening being closed and the dam between the two launder stubs being open, until the metal level has reached a level above the inlet and outlet openings;

evacuating air from the container to create an under-pressure as soon as the metal level is above the inlet and outlet openings, and opening the inlet and the outlet openings by removing the stoppers and thereby drawing the metal upwards until the metal stops against the filter in the outlet chamber and is above a top of the filter in the inlet chamber and holding the metal in this position;

closing the opening to the inlet chamber with the stopper and then increasing the under-pressure until the metal is forced up through the ceramic filter;

opening the container inlet by withdrawal of the stopper and adjusting the under-pressure until the metal reaches a pre-set level above the partition wall;

opening the dam by the outlet and simultaneously closing the dam between the two launder stubs and maintaining the under-pressure in the container at a pre-set level thereby causing the metal to flow through the container, by the end of the casting operation, gradually lowering the metal level inside the container by reducing the under-pressure in the container; and opening the dam between the two launder stubs when the metal has reached a preset level and releasing all of the remaining metal in the container to a casting pit.

12. The method in accordance with claim 11, further comprising preheating the interior of the container and the filter.

13. The method in accordance with claim 12, further comprising a heater provided in the lid of the container.

14. The method in accordance with claim 11, wherein metal is not drained from the filter container before a next casting operation, and the inlet and outlet openings are kept closed and the container and the melt are kept heated until a next filtering operation is started.

* * * * *